Aug. 24, 1965  D. W. PERKINS ETAL  3,202,985
TRUE THREE-DIMENSIONAL DISPLAY SYSTEM
Filed Sept. 26, 1961  3 Sheets-Sheet 1
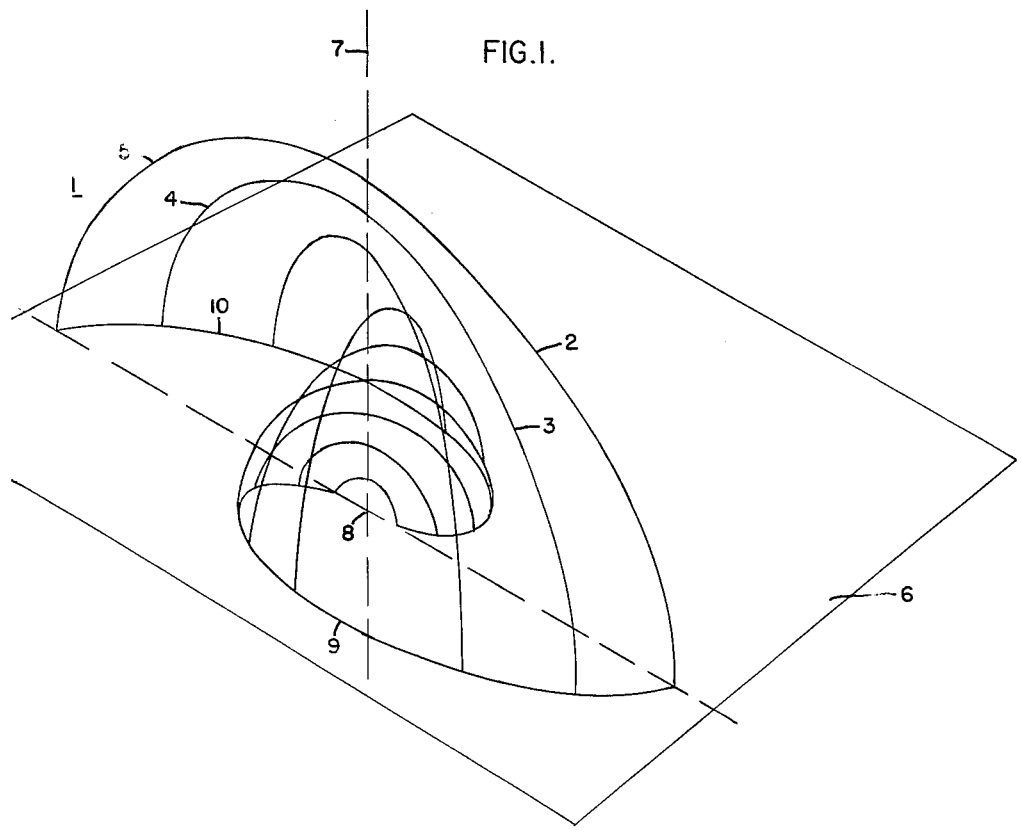
FIG.1.
FIG.2
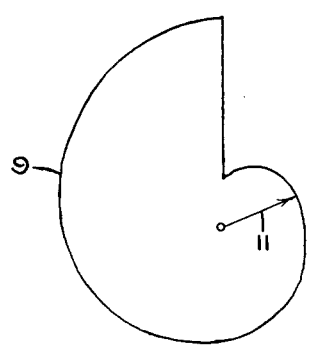
INVENTORS:
DONALD W. PERKINS,
JOSEPH A. WAINRIGHT,
BY Delbert A. Warner
THEIR ATTORNEY.

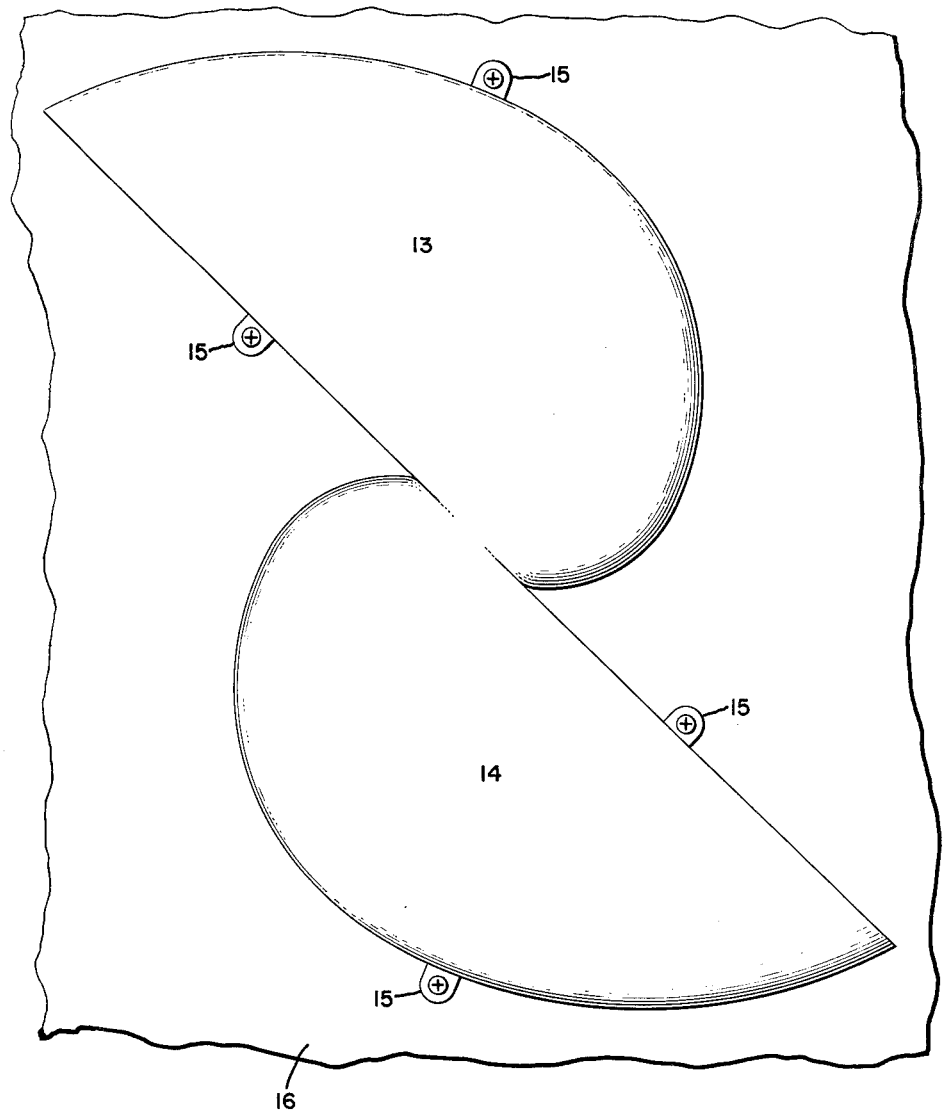

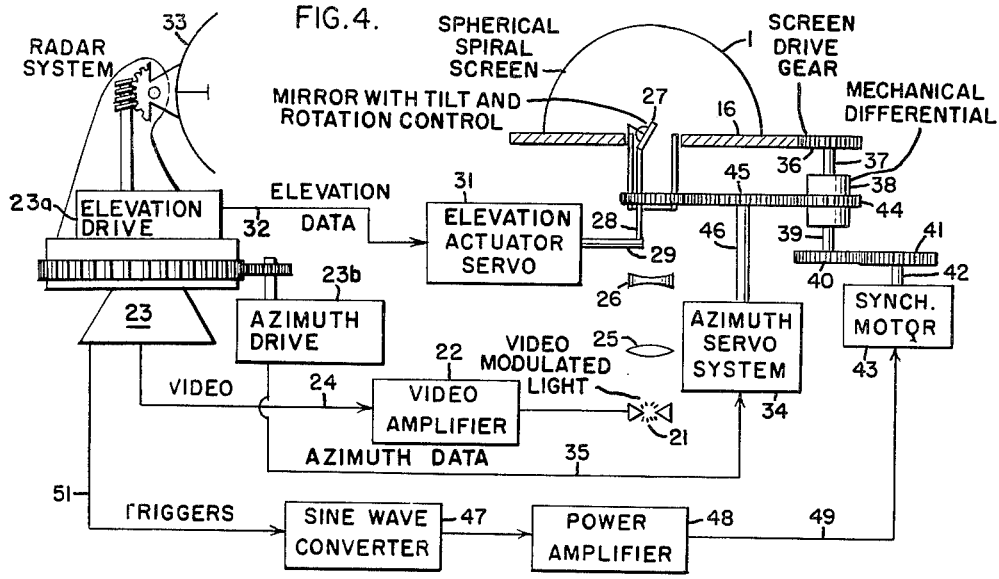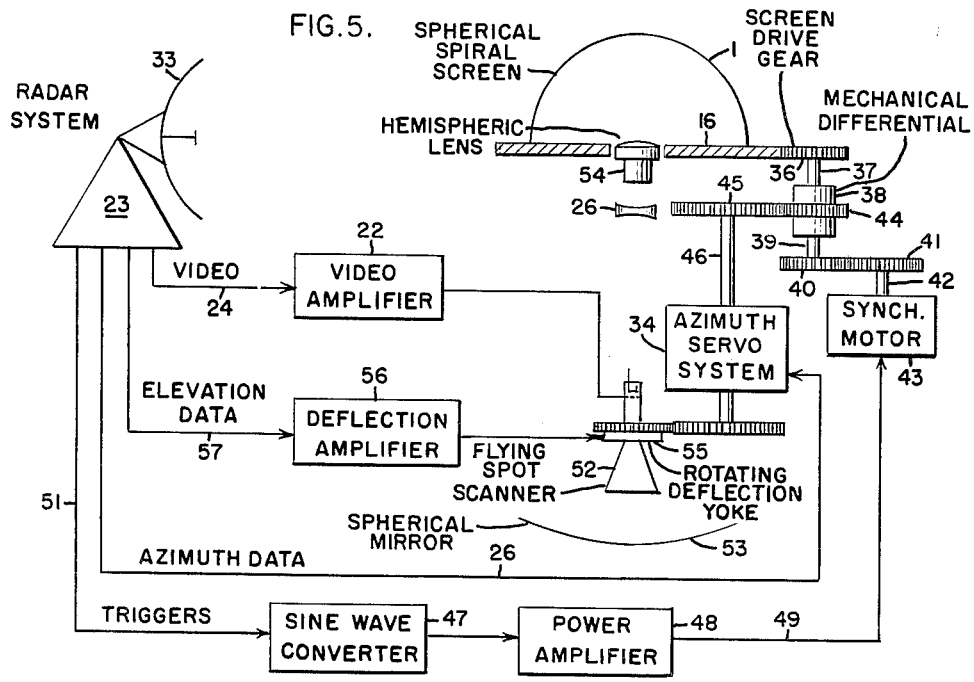

United States Patent Office 3,202,985
Patented Aug. 24, 1965

3,202,985
TRUE THREE-DIMENSIONAL DISPLAY SYSTEM
Donald W. Perkins, De Witt, and Joseph A. Wainright, Baldwinsville, N.Y., assignors to General Electric Company, a corporation of New York
Filed Sept. 26, 1961, Ser. No. 140,790
11 Claims. (Cl. 343—7.9)

This invention relates broadly to a three-dimensional display system for reproducing received information in three dimensions. More particularly this invention relates to a three-dimensional display system, which is primarily useful as a radar display.

A vast amount of data is presently being collected by three-dimensional radar systems which makes existing two-dimensional display devices inadequate for the proper display of this data. This is caused, in part, by the fact that the information density on a two-dimensional display is too high for proper comprehension; and additionally, the information gained by a three-dimensional radar system is obtained at great cost which is lost in a display upon which the information cannot be fully resolved. Attempts to use a second two-dimensional display to show the third dimension have the disadvantages of compressing the dimension which is not displayed, i.e. foreshortening a visual representation to correspond to a change in perspective, causing thereby, a large buildup of noise signals. Further, in a system of this type, it is not possible to correlate a single target on the two displays, in order to know which three dimensions apply to a particular target. Attempts have been made to provide three-dimensional display systems and the majority of the existing systems are based upon a stereoscopic effect, which has been used for at least half a century dating back to the old stereoptical viewers. There are several disadvantages in the use of the stereoscopic effect; notably, the fact that, when viewing such a display through viewers, focusing of the eye muscles is not utilized and, as a result, a considerable amount of depth perception is lost. Due to this characteristic, a straight horizontal line display on a conventional type of stereoscopic display cannot have any depth information contained in it. Likewise, a group of dots can be confused among each other so that when one eye is focusing on one of the dots, the other eye may be correlating a different dot with it. Other systems have been utilized to produce a three-dimensional display primarily comprising a two-dimensional display screen which is rotated, in order to sweep out a volume. The chief problem here is that in utilizing the information from the radar system it is necessary to translate any information from spherical to rectangular coordinates in order to apply it to such a system.

Therefore, a principal object of this invention is to provide an improved three-dimensional display system utilizing the received information in the coordinate system in which it is received.

Another object of this invention is to provide a three-dimensional display of a given scene along with coordinates identifying sections of the scene.

Another object of this invention is the provision for an improved resolution of three-dimensional images generated by screens having a cyclic motion.

Yet another object of this invention is the provision for an improved scanning arrangement for scanning a volume with a controlled energy beam such that any point in the volume may be illuminated.

A further object is the provision for an improved three-dimensional display system having an improved signal to noise ratio.

A feature of the present invention involves a three-dimensional display system consisting basically of a light projecting means which is controllable in azimuth and elevation to be projected onto a screen having a spherical spiral surface. The spherical spiral screen is rotated at a sufficiently high rate such that no flicker is discernible; and the controllable light beam is gated on only for the instant at which the radius of the screen corresponds to the radius to be displayed. In this manner, it is possible to actually illuminate any point within the volume which the spherical screen sweeps out during its rotation. The screen has the characteristic that distance from the center point varies linearly with the azimuth angle and is independent of the elevation angle.

While the specification concludes with claims particularly pointing out and distinctly claiming the subject matter which is regarded as the invention, it is believed the invention will be better understood from the following description taken in connection with the accompanying drawings in which:

FIG. 1 is a drawing of the development of one embodiment of the three-dimensional display screen;

FIG. 2 is a plan view or two-dimensional illustration of the same type of screen as shown in FIG. 1 showing only a single spiral with a radial line wherein the radial line represents a light beam and the spiral represents the display screen at zero degrees elevation angle;

FIG. 3 is a top view of a two section, three-dimensional display secured to a revolving platform;

FIG. 4 is a sectional view of a true three-dimensional display system with a mechanically controllable light beam and showing in block diagram associated electronic components; and FIG. 5 is a sectional view of a true three-dimensional display system with an electronically controllable light beam and a high efficiency optical system and showing in block diagram the associated electronic components.

Referring to FIG. 1, it will be seen that the display screen 1 of the subject invention has a spherical spiral surface. The surface of the display screen as shown by FIG. 1 is described by the locus of quarter circles such as 2, 3, 4 and 5 bounded by a plane 6 and a line 7 perpendicular to the plane 6. The point of intersection 8 of the line 7 and the plane 6 is the point of origin of the radii of the quarter circles. The locus of intersections of the quarter circles with the plane describes one or more identical sections 9 and 10 of a spiral in the interval of one revolution. The quarter circles in this drawing might be replaced by quarter ellipses where the perpendicular line 7 would be the axis of symmetry of the ellipses and the ratio of the major to minor axis would be constant. In FIG. 1, there are two sets of quarter circles, which in this case form semi-circles, from which are derived two identical sections of a spiral indicated by 9 and 10 and formed by the locus of the intersections of the quarter circles 2, 3, 4 and 5 with the plane 6. The quarter circles 2, 3, 4 and 5 in the embodiment shown by FIG. 1, are drawn so as to form semi-circles. The screen illustrated by FIG. 1 has the characteristic that the distance from its center point varies linearly with the azimuth angle of the screen and is independent of the elevation angle.

That the screen illustrated by FIG. 1 can provide a display at any azimuth independently of elevation angle can be illustrated by referring to FIG. 2 which shows a two-dimensional arrangement with merely a spiral 9 and a radial line 11; wherein, the radial line represents the light beam projected on the screen and the spiral 9 represents the display screen 1 of FIG. 1 at zero degrees elevation angle. In this arrangement, any azimuth can be represented by merely rotating the beam of light to the corresponding azimuth angle. To illuminate the proper point in range, the spiral is rotated until the radius of the spiral, at its intersection with the radial line, is proportional to the radius of the point, which is to be illuminated. In operation, the spiral is rotated at a sufficiently high rate so that no flicker is discernible and the light beam 11 is gated on only for the instant at which the radius of the screen corresponds to the radius to be displayed. When this two-dimensional concept is extended to the three-dimensional equivalent as shown in FIG. 1, the beam of light 11 (FIG. 2) must be controlled in elevation as well as in azimuth angle. As described above, the screen shown by FIG. 1 is developed by generating quarter circles or specifically in the case of FIG. 1, generating semi-circles originating from each point on two identical sections of a spiral, and lying in the plane of the vertical axis 7 of the display. Thus, a screen 1 is formed, whose radius at any azimuth angle is directly proportional to that azimuth angle and is independent of the elevation angle of the received signal. Therefore, it is possible with the three-dimensional display as shown in FIG. 1, to have display coordinates which correspond to the spherical coordinates in which most radar systems receive their data without any need for transformation from the spherical coordinate system to the rectangular coordinate system as in other devices which use a two-dimensional planar screen.

FIG. 3 shows the three-dimensional spherical spiral screen 1 having two sections 13 and 14. The screen 1 may be made of a transparent plastic material the outside surface or optical surface of which is frosted so that the point of intersection of a beam of light on this surface will be visible. The two sections 13 and 14 are secured by a plurality of plates such as 15 to the revolving platform or turntable 16. Another embodiment would allow for mounting of the display screen 1 in an evacuated envelope of a cathode ray tube in which case the inside surface of the sections 13 and 14 would be coated with a transparent phosphor. The screen would then be sensitive to electron bombardment by the cathode ray tube. However, the preferred embodiment as discussed in FIGS. 4 and 5 encompasses a screen having a frosted optical surface responsive to light beams.

FIG. 4 shows the three-dimensional spherical spiral screen 1 of this invention incorporated into a three-dimensional radar display system in which a point source of light 21 is modulated by a video signal from amplifier 22 which amplifies the video signal received from the three-dimensional radar system 23 via conductor 24. A beam of light from the point source 21 passes through a collector lens 25, is collimated by lens 26 and projected onto a rotatable and tiltable mirror 27 which will reflect the light beam onto the optical surface of the spherical spiral screen. The tiltable mirror 27 is connected by a rod 28 to the output shaft 29 of an elevation actuator servo motor 31. Mirror 27 is tilted in response to elevation data transmitted by conductor 32 from the antenna elevation drive system 23a of the three-dimensional radar system 23 to the elevation actuator servo 31. The display mirror 27 is additionally rotated in synchronism with the radar antenna 33 of the radar system 23 by means of an azimuth servo system 34 which receives azimuth data via conductor 35 from the antenna azimuth drive 23b of the three-dimensional radar system 23. Accordingly, the light beam projected onto the optical surface of the screen 1 from the mirror 27 will have the same azimuth and elevation angles as the radar beam. The three-dimensional radar system 23 together with the various servo motors and associated circuitry are all well known conventional equipment.

The screen 1 is supported on a turntable 16, which is connected by means of the screen drive gear 36 to the output shaft 37 of the mechanical differential 38. The input shaft 39 of the mechanical differential 38 is connected by means of gears 40 and 41 to the output shaft 42 of the synchronous motor 43. The mechanical differential 38 is also connected by means of gears 44 and 45 to output shaft 46 of the azimuth servo system 34.

The screen 1 will be rotated in response to a signal received by a sine wave converter 47, the output signal of which is amplified by amplifier 48 and then connected via conductor 49 to the synchronous motor 43. The screen will rotate through one complete cycle in the period between any consecutive pair of radar trigger signals, which will actuate the sine wave converter 47 and are transmitted to the sine wave converter 47 via conductor means 51 from the three-dimensional radar system 23. The speed will normally be such that the display screen 1 will turn through one complete cycle (normally one-half or one-third of a revolution) in the period between any consecutive pair of radar trigger signals, which correspond to the frequency with which signals are beamed by the antenna. The phase of the screen will be such that the intersection of the light beam with the minimum radius of the screen will correspond in time to when a radar signal return from a proportional range is received. In order that the range correspondence between the display screen 1 and the three-dimensional radar system 23 is maintained at all azimuth angles, the azimuth servo system 34 will act upon the mechanical differential 38 by means of gears 44 and 45 to advance or retard the phase of the display screen 1 in accordance with changes in the azimuth of the radar antenna 33. Therefore, any target detected by the radar system will cause a point on the rotating screen 1, having the same elevation angle at a proportional radius, to be simultaneously illuminated at the same azimuth angle. The gating of the light source 21 will take place therefore, at the instant when the radius of the screen 1 corresponds to the radius to be displaced, for example, if a beam from the light source 21 represents the position of an aircraft and such position being 90° at a specific radius, the video amplifier will cause the light source to be modulated at the precise instant when the corresponding radius of the screen is at a position of 90° azimuth.

FIG. 5 is a three-dimensional display system quite similar to that of FIG. 4 in which however, the light beam is electronically controllable rather than electromechanically controllable due to the use of a flying spot scanner 52, which is a high intensity cathode ray tube, in place of the gated light source, and a "hemispheric" (extremely wide angle) lens in place of the mechanically operated, rotatable, tiltable mirror 27, FIG. 3. Angular deflection is obtained by deflecting the spot on the flying spot scanner and projecting it as reflected from the spherical mirror 53 through the collimating lens 26 and the hemispheric lens 54. This combination of mirror 53, collimating lens 26 and hemispheric lens 54 is a variation of the conventional, well known Schmidt optical projection system. There is a 1 to 1 correspondence between the angle of rotation of the scanner spot and the azimuth angle of the image projected on the display screen 1. The radius of the scanner spot causes a linear change in beam angle from the vertical. The time of generation of the scanner spot controls the display radius as a linear periodic function of the screen rotational rate. In the embodiment shown by FIG. 5, the azimuth servo system 34 will rotate the deflection yoke 55 of the scanner 52, in a manner so as to keep the azimuth of the light beam from the flying spot scanner 52 in synchronism with the radar beam. In place of the elevation actuator servo 31, FIG. 4, a deflection amplifier 56 receives elevation data from the three-dimensional radar system 23 via conductor 57 and is connected to the deflection yoke 55 of the scanner 52 in a manner to cause the spot on the scanner 52 to be deflected radially in direct proportion to the angle of the radar beam from the vertical, thereby resulting in the scanner spot being projected at the same vertical angle as the radar beam. Scanner 52 is intensity modulated by means of the radar video amplifier 22, which receives the video return signal from the radar system 23 via conductor 24. As the display screen 1 is rotated as described above in synchronism with the radar trigger signal frequency, a miniature of the target seen by the radar system 23 is reproduced in its true geometric form on the screen 1. Position modulation of the scanner spot will produce angular modulation of the projection of this spot. Therefore, the direction of the scanner deflection from the center corresponds to the azimuth angle and the radial distance produces an almost linear change in the declination angle.

It is obvious to those skilled in the art that color may be introduced into the display system by making the two sections 13 and 14 (FIG. 3) of the display screen different colors, for instance red and green. This cuts the display rate in half, but provides an interlace of red and green type targets. Additionally, a grid coordinate system can be generated merely by providing bright spots which rotate with the screen. This can be produced by coating the screen with a fluorescent phosphor illuminated by an ultra-violet light overhead. Alternately, provision may be made for small neon, incandescent or electroluminescent lamps embedded into the surface. By providing these fluorescent spots or bright spots or small neon lamps, it is possible to add range rings or range cylinders or elevation planes or even angle marks to the system. In applications where rectangular grids are required it is possible to project a rectangular grid system from overhead with a conventional type slide projector.

As previously mentioned briefly, instead of using a light beam, an electron beam could be directed to impinge upon a rotating screen at a proper angle and time if the display screen were mounted within the evacuated envelope of a cathode ray tube. This would completely eliminate the optical system from the display by substituting electron optics. By use of transparent phosphors on the screen the display could be viewed completely from any angle. Yet another application of the three-dimensional display system of this invention is for a real time presentation of simultaneous outputs of stacked beam type radar systems. In this type of operation, an array of individually gated light sources corresponding to the receiving beam array is utilized. These are projected through a Schmidt optical system or its equivalent and a hemispherical lens onto the screen as described above. The screen is rotated in synchronism with the radar pulse repetition rate. Each receiver modulates one of the light sources in accordance with its video returns. The net result is a three-dimensional presentation of the simultaneous outputs in real time of all receivers.

Although particular embodiments of the subject invention have been described, many modifications may be made and it is understood to be the intention of the appended claims to cover all such modifications that fall within the true spirit and scope of the invention.

What we claim as new and desire to secure by Letters Patent of the United States is:

1. A display screen having a surface generated by a plurality of quarter ellipses of uniform ellipticity having a common major axis and a plurality of minor axes, said minor axes of said ellipses lying in a single plane, and said surface having as an outer boundary at least one section of a spiral formed by the locus of the intersection of the quarter ellipses with said plane.

2. A display screen having a surface generated by a plurality of quarter circles located between a plane and a line perpendicular to the plane, said quarter circles having a center point at the point of intersection of the line and the plane, and said surface having as an outer boundary at least one section of a spiral formed by the locus of the intersections of the quarter circles with said plane.

3. A display screen having a frosted plastic surface generated by a plurality of quarter circles located between a plane and a line perpendicular to the plane, said quarter circles having a center point being the point of intersection of the line and plane, and said surface having as an outer boundary at least one section of a spiral formed by the locus of the intersections of the quarter circles with said plane.

4. A display screen having a frosted plastic surface comprising two sections of different color generated by a plurality of quarter circles located between a plane and a line perpendicular to said plane, the intersection of the line with said plane being the point of origin of the quarter circles, and said surface having as an outer boundary two identical sections of a spiral formed by the locus of the intersections of the quarter circles with said plane.

5. A three-dimensional display means comprising a system including a source of information for supplying data concerning the position of objects to be displayed, a display screen having a surface generated by a plurality of quarter circles located between a plane and a line perpendicular to the plane, said quarter circles having a center point at the point of intersection of the line and the plane, and said surface having as an outer boundary at least one section of a spiral formed by the locus of the intersections of said quarter circles with said plane, means for impressing on said screen the positional data of the objects to be displayed, and means to rotate said screen at a rate equal to the rate at which the positional data is impressed on said screen to form apparently persisting images within the volume swept through by said screen during rotation.

6. A three-dimensional display means comprising a system including a source of information for supplying data concerning the position of objects to be displayed, a light sensitive screen having a surface generated by a plurality of quarter circles located between a plane and a line perpendicular to the plane, said quarter circles having a center point being the point of intersection of the line and the plane, said surface having as an outer boundary at least one section of a spiral formed by the locus of the intersections of said quarter circles with said plane, means for impressing on said screen the positional data of the objects to be displayed at the instant the screen position corresponds to the position of the object to be displayed, and means to rotate said screen at a rate responsive to the rate at which the positional data is impressed on said screen to form apparently persisting images within a volume swept through by said screen during rotation.

7. A three-dimensional display system comprising a system including a source of information for supplying data concerning the position of objects to be displayed, a light sensitive screen having a surface generated by a plurality of quarter circles located between a plane and a line perpendicular to said plane, said quarter circles having a center point being the point of intersection of the line and the plane, said surface having as an outer boundary at least one section of a spiral formed by the locus of the intersections of said quarter circles with said plane, image producing means for impressing on said screen the positional data of the objects to be displayed, including a cathode ray tube for forming spots of light, and an optical projection and reflection means disposed between said cathode ray tube and said screen for projecting spots of light formed by said cathode ray tube upon said viewing screen, means to gate said tube on at the instant a selected angular position of said display screen corresponds to the position of the object to be displayed, and a means to rotate said screen at a rate equal to the rate at which the positional data is impressed on said screen to form apparently persisting images within the volume swept through by said screen.

8. A three-dimensional display comprising, an information system for obtaining a first signal indicative of the presence of objects to be displayed, said information system including an antenna to gather the information and means to vary the azimuth and elevation angle of said antenna in a predetermined manner, a light sensitive screen having a surface generated by a plurality of quarter circles located between a plane and a line perpendicular to said plane, said quarter circles having a center point located at the point of intersection of said line with said plane, said surface having as an outer boundary at least one section of a spiral formed by the locus of intersections of said quarter circles with said plane, a light source, first means to modulate said light source in response to said first signal from said information system to produce a light beam, a rotatable and tiltable mirror to project said light beam on to said screen, a lens system positioned between said light source and said mirror to focus said light beam on said mirror, second means responsive to the elevation angle of said antenna to tilt said mirror in synchronism with said antenna, third means responsive to the azimuth angle of said antenna to rotate said mirror in synchronism with said antenna, and means to rotate said screen at a rate responsive to the rate at which positional data is impressed on said screen to form apparently persisting images within a volume swept through by said screen during rotation.

9. A three-dimensional display means comprising, an information system for obtaining a first signal indicative of the presence of objects to be displayed, said information system including an antenna to gather the information and means to vary the azimuth and elevation angle of said antenna in a predetermined manner, a light sensitive screen having a surface generated by a plurality of quarter circles located between a plane and a line perpendicular to said plane, said quarter circles having a center point located at the intersection of said line with said plane, said surface having as an outer boundary at least one section of a spiral formed by the locus of intersection of quarter circles with said plane, a flying spot scanner having an electron sensitive surface responsive to electron beams to produce a light beam, first means to gate said flying spot scanner in response to said first signal from said information system to produce an electron beam, an optical system to collect and focus on said screen the light beam produced by said electron beam striking said electron sensitive surface, second means responsive to the elevation angle of said antenna to deflect said electron beam in synchronism with said antenna, third means responsive to the azimuth angle of said antenna to rotate said electron beam in synchronism with said antenna, and means to rotate said screen at a rate responsive to the rate at which positional data is impressed on said screen to form apparently persisting images within a volume swept through by said screen during rotation.

10. A three-dimensional display comprising, an information system for obtaining a first signal indicative of the position of objects to be displayed, said information system including an antenna to gather the information and means to vary the azimuth and elevation angle of said antenna in a predetermined manner, a screen, a light source, means to modulate said light source in response to said first signal from said information system to produce a light beam, a rotatable and tiltable mirror to project said light beam on to said screen, a lens system positioned between said light source and said mirror to focus said light beam on said mirror, second means responsive to the elevation angle of said antenna to tilt said mirror in synchronism with said antenna, third means responsive to the azimuth angle of said antenna to rotate said mirror in synchronism with said antenna, and means to rotate said screen at a rate responsive to the rate at which positional data is impressed on said screen to form images which from viewpoints in a 360° sector appear to persist within a volume swept through by said screen during rotation.

11. A three-dimensional display comprising, an information system for obtaining a first signal indicative of objects to be displayed, said information system including an antenna to gather the information and means to vary the azimuth and elevation angle of said antenna in a predetermined manner, a screen, a flying spot scanner having an electron sensitive surface responsive to electron beams to produce a light beam, first means to gate said flying spot scanner in response to said first signal from said information system to produce an electron beam, an optical system to collect and focus on said screen the light beam produced by said electron beam striking said electron sensitive surface, second means responsive to the elevation angle of said antenna to deflect said electron beam in synchronism with said antenna, third means responsive to the azimuth angle of said antenna to rotate said electron beam in synchronism with said antenna, and means to rotate said screen at a rate responsive to the rate at which positional data is impressed on said screen to form images which from all viewpoints in a hemisphere appear to persist within a volume swept through by said screen during rotation.

References Cited by the Examiner

UNITED STATES PATENTS

| | | | |
|---|---|---|---|
| 2,479,953 | 8/49 | Miller | 343—11 |
| 2,528,142 | 10/50 | Herzlinger | 343—11 |
| 2,967,905 | 1/61 | Hirsch | 343—7.9 |
| 3,079,585 | 2/63 | Perry et al. | 343—7.9 X |
| 3,097,261 | 7/63 | Schipper et al. | 343—7.9 X |

CHESTER L. JUSTUS, *Primary Examiner.*